(12) United States Patent
Benedetti et al.

(10) Patent No.: US 8,974,164 B2
(45) Date of Patent: Mar. 10, 2015

(54) PLASTIC HIGH HEAT FASTENER

(75) Inventors: Steven M. Benedetti, Sterling Heights, MI (US); Patricia Patt, Harrison Township, MI (US)

(73) Assignee: Newfrey LLC, Newark, DE (US)

( * ) Notice: Subject to any disclaimer, the term of this patent is extended or adjusted under 35 U.S.C. 154(b) by 340 days.

(21) Appl. No.: 13/533,528

(22) Filed: Jun. 26, 2012

(65) Prior Publication Data

US 2013/0343829 A1 Dec. 26, 2013

(51) Int. Cl.
*F16B 39/284* (2006.01)
*F16B 37/08* (2006.01)
*F16B 43/00* (2006.01)

(52) U.S. Cl.
CPC .............. *F16B 39/284* (2013.01); *F16B 37/08* (2013.01); *F16B 43/002* (2013.01)
USPC ............................ 411/186; 411/432; 411/532

(58) Field of Classification Search
USPC ......... 411/908, 427, 158, 184–186, 1–3, 432, 411/532
See application file for complete search history.

(56) References Cited

U.S. PATENT DOCUMENTS

| | | | | |
|---|---|---|---|---|
| 1,380,395 A * | 6/1921 | Korach | ............................. | 411/3 |
| 1,457,749 A * | 6/1923 | Rast | ................................. | 411/10 |
| 1,464,591 A * | 8/1923 | Weichold, Jr | ................. | 411/276 |
| 1,874,462 A * | 8/1932 | Crowther | ..................... | 411/82.2 |
| 1,961,470 A * | 6/1934 | Winchester et al. | .......... | 411/134 |
| 2,380,994 A * | 8/1945 | Pummill | ....................... | 411/270 |
| 2,520,259 A * | 8/1950 | Pummill | ....................... | 411/265 |
| 2,761,349 A * | 9/1956 | Heller | ............................ | 411/432 |
| 2,851,079 A * | 9/1958 | Heller | ............................ | 411/303 |
| 2,981,651 A * | 4/1961 | Arnold | ........................... | 411/542 |
| 3,102,571 A | 9/1963 | Scott | | |
| 3,191,730 A * | 6/1965 | Fischer | ......................... | 411/542 |
| 3,273,441 A * | 9/1966 | Biesecker | ..................... | 411/429 |
| 3,345,899 A | 10/1967 | Fiddler | | |
| 3,425,473 A * | 2/1969 | Knowlton | ..................... | 411/134 |
| 3,659,491 A * | 5/1972 | Duffy et al. | .................. | 411/436 |
| 3,678,979 A * | 7/1972 | Bjorklumd | .................... | 411/134 |
| 3,796,123 A * | 3/1974 | Duffy et al. | .................. | 411/427 |

(Continued)

FOREIGN PATENT DOCUMENTS

JP 2009-287766 A 12/2009

OTHER PUBLICATIONS

Boedecker Plastics: PEEK HT High Temperature PolyEtherEtherKetone Datasheet (available at http://web.archive.org/web/20031002061000/http://www.boedecker.com/peekht_p.htm, web archive date: Oct. 2, 2003).*

*Primary Examiner* — Gay Ann Spahn
(74) *Attorney, Agent, or Firm* — Harness, Dickey & Pierce, P.L.C.

(57) ABSTRACT

A polymeric fastener includes a body having multiple sides adapted to accept a tool for applying torque to the body to axially rotate the body with respect to a body longitudinal axis. A flange integrally connected to the body extends perpendicular to the longitudinal axis. A wave-shaped washer integrally connected to the flange has multiple valleys interposed between multiple oppositely directed peaks. Multiple triangular shaped frangible connectors integrally join the flange to the wave-shaped washer. Each frangible connector is integrally connected at a first end to the flange, and is integrally connected at an opposite connecting tip to an individual one of the peaks. The connecting tip has a reduced thickness compared to the first end to induce fracture of each frangible connector at the connecting tip.

23 Claims, 11 Drawing Sheets

(56) References Cited

U.S. PATENT DOCUMENTS

| | | | | |
|---|---|---|---|---|
| 3,826,458 | A * | 7/1974 | Fisher | 411/182 |
| 3,964,364 | A * | 6/1976 | Poe | 411/43 |
| 3,987,761 | A * | 10/1976 | Downs et al. | 122/20 B |
| 4,114,506 | A * | 9/1978 | Aimar | 411/512 |
| 4,132,145 | A * | 1/1979 | Becker | 411/427 |
| 4,269,248 | A * | 5/1981 | MacLean et al. | 411/186 |
| 4,293,256 | A * | 10/1981 | Pamer | 411/11 |
| 4,472,097 | A * | 9/1984 | Kiefer et al. | 411/369 |
| 4,472,098 | A * | 9/1984 | Kiefer | 411/369 |
| 4,498,825 | A * | 2/1985 | Pamer et al. | 411/11 |
| 4,518,295 | A | 5/1985 | Matuschek | |
| 4,654,913 | A * | 4/1987 | Grube | 470/18 |
| 4,690,365 | A * | 9/1987 | Miller et al. | 411/258 |
| 4,715,756 | A * | 12/1987 | Danico et al. | 411/369 |
| 4,756,654 | A * | 7/1988 | Clough | 411/437 |
| 4,836,727 | A * | 6/1989 | Volkmann | 411/4 |
| 4,887,948 | A | 12/1989 | Calmettes | |
| 4,934,856 | A * | 6/1990 | Pauc | 411/542 |
| 4,979,857 | A | 12/1990 | Wing | |
| 5,020,949 | A * | 6/1991 | Davidson et al. | 411/7 |
| 5,205,692 | A * | 4/1993 | Kelbert et al. | 411/173 |
| 5,407,313 | A * | 4/1995 | Bruins et al. | 411/544 |
| 5,474,409 | A | 12/1995 | Terry | |
| 5,865,581 | A * | 2/1999 | Sadri et al. | 411/5 |
| 5,944,222 | A * | 8/1999 | Fuchs et al. | 222/82 |
| 5,993,246 | A * | 11/1999 | Moldenhauer et al. | 439/474 |
| 6,109,848 | A * | 8/2000 | Werner | 411/5 |
| 6,976,817 | B1 * | 12/2005 | Grainger | 411/204 |
| 7,182,563 | B2 * | 2/2007 | Wimmer et al. | 411/174 |
| 7,186,030 | B2 * | 3/2007 | Schlanger | 411/16 |
| 7,406,770 | B2 * | 8/2008 | Mace et al. | 411/432 |
| 7,857,566 | B2 * | 12/2010 | Sullivan et al. | 411/155 |
| 8,100,617 | B2 * | 1/2012 | Cymbal | 411/222 |
| 8,454,290 | B2 * | 6/2013 | Schaser et al. | 411/544 |
| 8,662,805 | B2 * | 3/2014 | Schaeffer et al. | 411/3 |
| 2002/0136617 | A1 * | 9/2002 | Imahigashi | 411/533 |
| 2002/0187020 | A1 * | 12/2002 | Julien | 411/544 |
| 2005/0008458 | A1 * | 1/2005 | Keech et al. | 411/555 |
| 2005/0271497 | A1 * | 12/2005 | Heim et al. | 411/544 |
| 2007/0128003 | A1 * | 6/2007 | Shiu | 411/533 |
| 2008/0226419 | A1 * | 9/2008 | Holt et al. | 411/347 |
| 2010/0014938 | A1 * | 1/2010 | Sussenbach | 411/309 |
| 2010/0040430 | A1 * | 2/2010 | McKinlay | 411/134 |
| 2012/0177462 | A1 * | 7/2012 | Fritzinger et al. | 411/413 |

* cited by examiner

PLASTIC HIGH HEAT FASTENER

FIELD

The present disclosure relates to plastic fasteners used in high temperature applications.

BACKGROUND

This section provides background information related to the present disclosure which is not necessarily prior art.

Metal fasteners are known that are pushed or threaded onto a weld stud of a vehicle body panel in an area where the fastener can be used to retain a heat shield, for example a heat shield near the catalytic converter of an exhaust system. At present, metal fasteners used for this purpose are subject to corrosion and therefore may fail, which causes the heat shield to loosen, rattle, and/or fall off. In addition, known fastening systems have multiple component parts such as a nut and separate washer, which add to the complexity and cost of installation.

SUMMARY

This section provides a general summary of the disclosure, and is not a comprehensive disclosure of its full scope or all of its features.

According to several aspects, a polymeric fastener includes a body having multiple sides adapted to receive a tool induced rotational torque. A flange is integrally connected to the body. A wave-shaped washer is integrally connected to the flange, the wave-shaped washer having multiple valleys interposed between multiple oppositely directed peaks. Multiple frangible connectors integrally connect the flange to the wave-shaped washer. Each frangible connector is integrally connected at a first end to the flange, and is integrally connected at an opposite connecting tip to an individual one of the peaks.

According to other aspects, a polymeric fastener includes a body having multiple sides adapted to be engaged by a tool for applying torque to axially rotate the body with respect to a body longitudinal axis. A flange is integrally connected to the body and extends perpendicular to the body longitudinal axis. A wave-shaped washer is integrally connected to the flange. The wave-shaped washer has multiple valleys interposed between multiple oppositely directed peaks. Multiple triangular shaped frangible connectors integrally join the flange to the wave-shaped washer. Each frangible connector is integrally connected at a first end to the flange, and is oppositely integrally connected at a connecting tip to an individual one of the peaks. The connecting tip has a reduced thickness compared to the first end to induce fracture of each frangible connector at the connecting tip.

According to still other aspects, a polymeric fastener includes a body having multiple sides adapted to be engaged by a tool for applying torque to axially rotate the body with respect to a body longitudinal axis. A flange is integrally connected to the body and extends perpendicular to the body longitudinal axis. A wave-shaped washer is integrally connected to the flange, the wave-shaped washer having multiple valleys interposed between multiple oppositely directed peaks. Multiple triangular shaped frangible connectors integrally join the flange to the wave-shaped washer. Each frangible connector is integrally connected at a first end having a maximum thickness to the flange, and is oppositely integrally connected at a connecting tip having a minimum thickness to an individual one of the peaks. The connecting tip minimum thickness defines a fracture line extending radially outward and transverse with respect to the body longitudinal axis acting to induce fracture of each frangible connector at the connecting tip during axial rotation of the body with respect to the wave-shaped washer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
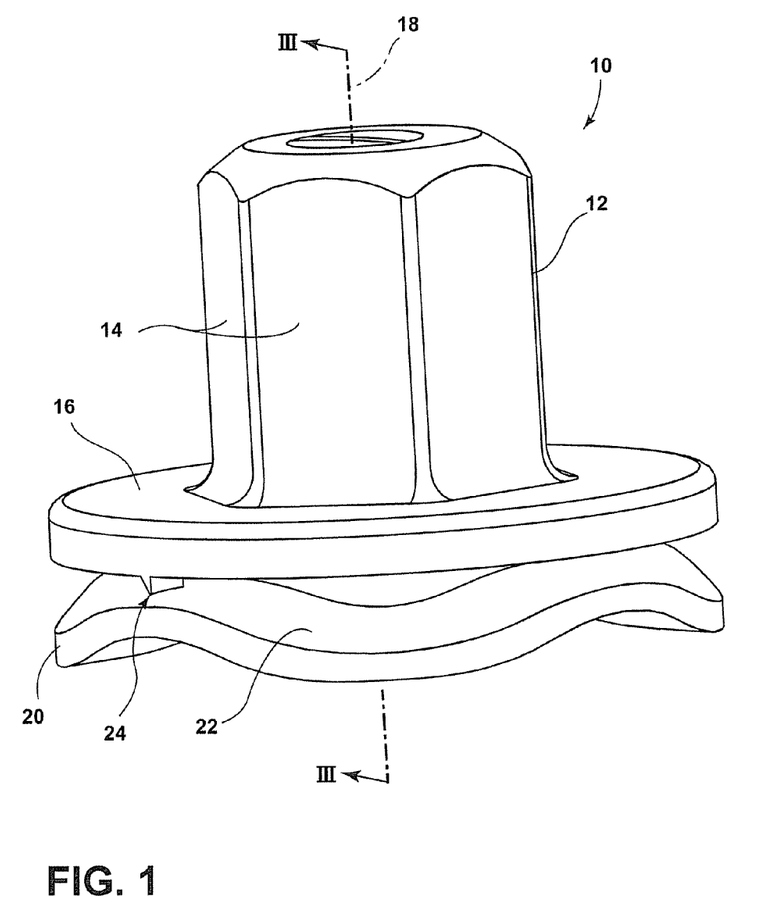
FIG. 1 is a front elevational perspective view of a fastener having an integrally connected wave-shaped washer of the present disclosure.

Referring to FIG. 1, a polymeric high heat fastener 10 includes a polygonal shaped body 12 made for example from a high temperature resistant material such as PEEK having multiple faces or sides 14 adapted to accept a tool such as a wrench (not shown) for applying installation rotation and torque. A flange 16 is integrally connected to body 12 and extends perpendicular to a longitudinal axis 18 of body 12. A wave-shaped washer 20 is integrally connected to flange 16. Wave-shaped washer 20 has multiple valleys 22 interposed between oppositely directed peaks 24. The peaks 24 define the closest points of approach of wave-shaped washer 20 with respect to flange 16 in a manufactured condition of fastener 10, as depicted in FIG. 1. Fastener 10 can be made using an injection molding operation, and all the components are initially integrally connected and are homogeneous in that the same material and material properties exist throughout fastener 10.

Referring to FIGS. 2A and 2B, and again to FIG. 1, multiple frangible connectors 26 are integrally connected at a first end 25 to a lower surface 28 of flange 16. Each of the frangible connectors 26 is triangular shaped and includes a first side 30, which according to several aspects is oriented substantially perpendicular to flange 16, and a second side 32, angularly oriented with respect to flange 16 and first side 30. The first end 25 defines a maximum thickness Tmax of the frangible connectors 26, and an opposite end or connecting tip 33 of each of the frangible connectors 26 defines a minimum thickness Tmin, such connecting tips 33 represent a film thickness substantially defining a point connection between frangible connector 26 and peak 24. Connecting tips 33 extend for an entire width "W" of the frangible connectors 26 connecting each frangible connector 26 to one of the peaks 24 of wave-shaped washer 20. The provision of the minimum thickness Tmin at connecting tip 33 induces fracture to occur along a fracture line 27 defined at the junction of connecting tip 33 and peak 24, thereby minimizing a force required to fracture the frangible connector 26 at connecting tip 33 from peak 24.

The second side 32 is oriented at an obtuse angle α with respect to lower surface 28 and extends to the connecting tip 33. The second side 32 is therefore also oriented at an acute angle β with respect to an upper face 56 of peak 24. As flange 16 and body 12 co-rotate with respect to wave-shaped washer 20 during installation of fastener 10 in a rotational direction "R", the minimum thickness Tmin at connecting tip 33 induces fracture of frangible connectors 26 at the connecting tip 33. The angular orientation of second side 32 orients second side 32 to angularly face or be directed toward the peaks 24 of wave-shaped washer 20 such that the second sides 32 of the frangible connectors 26 contact and slide along wave-shaped washer 20 after frangible connectors 26 fracture and during subsequent application of installation torque to fastener 10. The angular facing second sides 32 reduce rotating friction between the frangible connectors 26 and wave-shaped washer 20 after they fracture and when body 12 is axially rotated. According to further aspects, to further enhance the bending of frangible connectors 26 prior to and after fracture of connecting tip 33, first side 30 can also be oriented at an acute angle with respect to flange 16, represented as first side 30' in FIG. 2B. As evident in FIG. 2B, the acute angle of first side 30' will also act to reduce the maximum thickness Tmax and promote bending of the frangible connectors 26 after fracture of the connecting tips 33.

The frangible connectors 26 are also oriented such that the fracture line 27 defined by the line of contact between connecting tip 33 and peak 24 extends both substantially transverse to and radially outward with respect to the longitudinal axis 18. This presents a minimum connection thickness of frangible connectors 26 in an orientation that further minimizes the resistance to bending/fracture of the frangible connectors 26 at connecting tip 33 as body 12 is axially rotated in direction "R" with respect to longitudinal axis 18, at the same time that wave-shaped washer 20 contacts an object such as a heat shield (shown and described in reference to FIG. 4). The resistance to axial rotation as wave-shaped washer 20 frictionally contacts the object thereafter provides resistance to further rotation of body 12, which produces the force necessary to fracture frangible connectors 26 at the connecting tips 33. During this axial rotational motion of body 12, the frangible connectors 26 are subject to bending and shear forces acting in a force direction "C" perpendicular to fracture line 27, which act to break the frangible connectors 26 at connecting tip 33, with the angled second side 32 positioned in an orientation to thereafter slidingly contact the wave-shaped washer 20. This allows the body 12 to more freely axially rotate with respect to wave-shaped washer 20 during subsequent compression of wave-shaped washer 20.

Figure 2A:
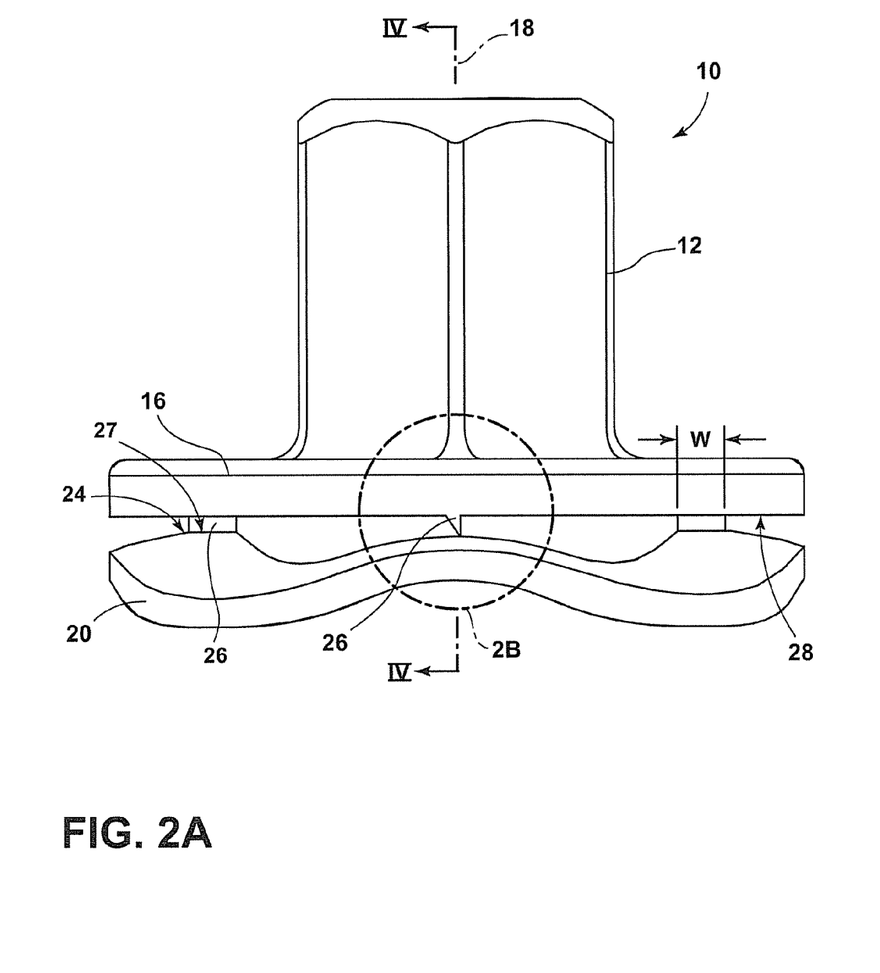
FIG. 2A is a front elevational view of the fastener of FIG. 1.
Figure 2B:
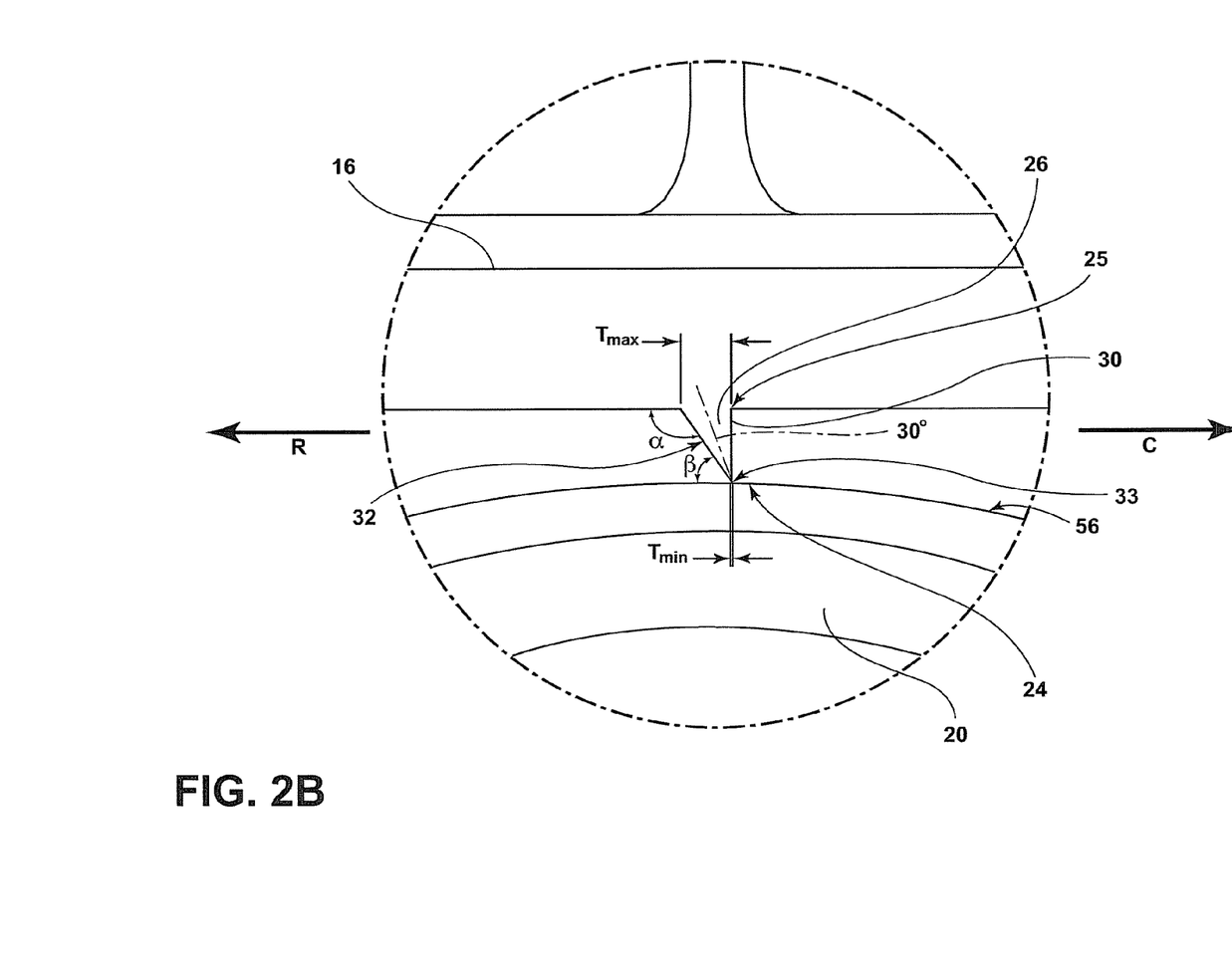
FIG. 2B is a front elevational view of area 2B of FIG. 1.

Referring to FIG. 3 and again to FIGS. 1-2, a through-bore 34 of body 12 has an entrance cavity 36 leading into an internally threaded portion 38. The frangible connectors 26 initially provide a clearance gap 40 between the flange 16 and the peaks 24 of wave-shaped washer 20. Although wave-shaped washer 20 is shown having a diameter substantially equal to a diameter of flange 16, the diameter of wave-shaped washer 20 can be larger or smaller than the diameter of flange 16.

Figure 3:
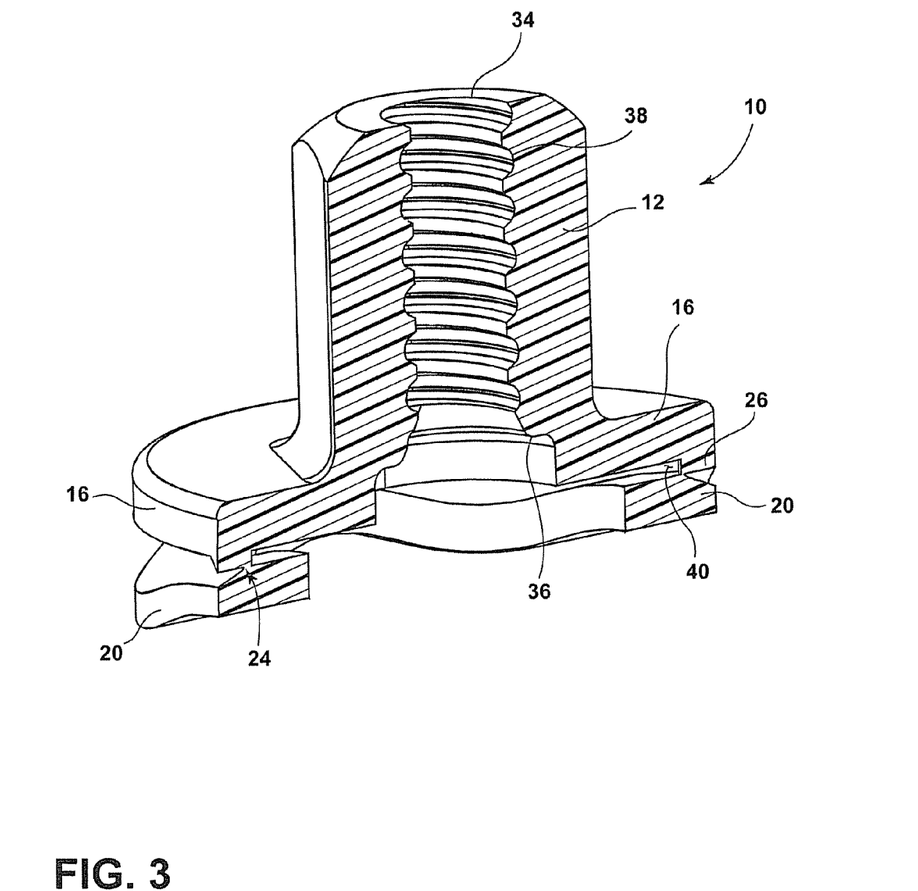
FIG. 3 is a front perspective cross sectional view taken at section III of FIG. 1.

Referring to FIG. 4 and again to FIGS. 1-3, in a partially installed condition of fastener 10, a weld-stud 42 is shown fixed to a body panel 44 of a vehicle. Weld-stud 42 extends upwardly through an aperture 46 created in a heat shield 48 which abuts the body panel 44. External threads 50 of weld-stud 42 threadably engage with internal threads 52 created in the threaded portion 38 of body 12. Wave-shaped washer 20 is brought into contact with heat shield 48 in the partially installed condition by axial rotation of fastener 10. At this time, the clearance gap 40 is provided between an upper face 56 of each of the peaks 24 and the lower surface 28 of flange 16, and a spacing or distance between the peaks 24 and valleys 22 defines a distance "D". Initially, the clearance gap 40 is present until subsequent axial rotation of body 12 about longitudinal axis 18 causes fracture of each frangible connector 26 at a fracture location 54 also defining the fracture line 27, as the wave-shaped washer 20 frictionally engages the heat shield 48. Contact of wave-shaped washer 20 with heat shield 48 thereafter resists rotation of wave-shaped washer 20.

Figure 4:
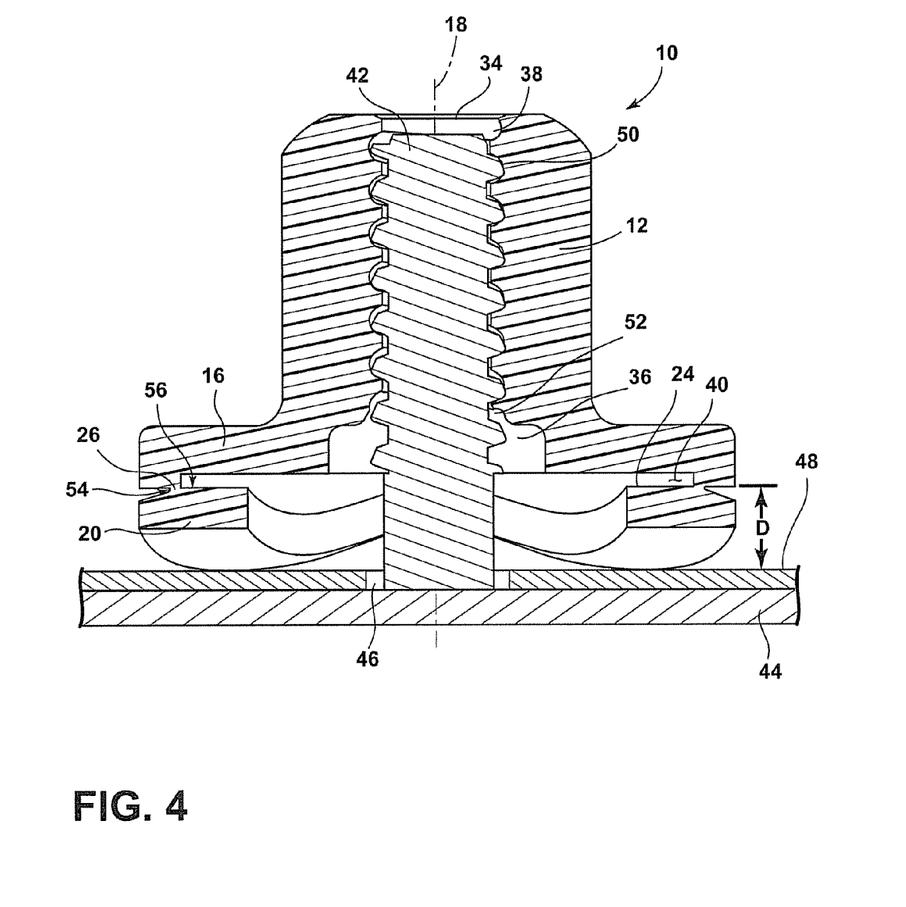
FIG. 4 is a front elevational cross sectional view taken at section IV of FIG. 2.
Figure 5:
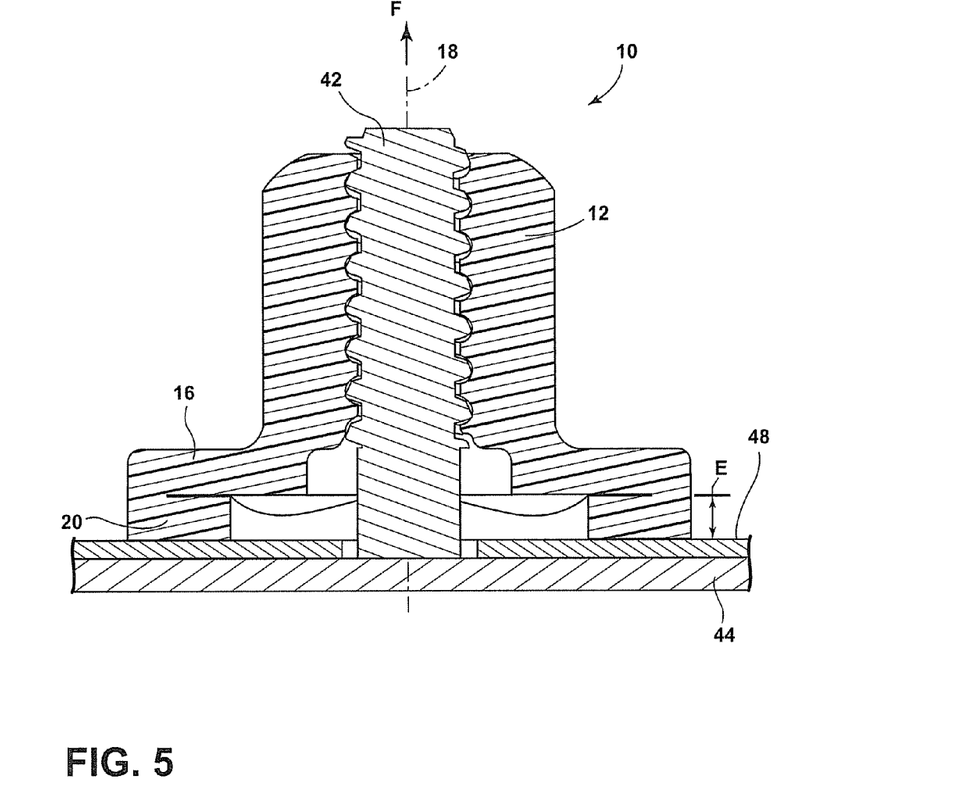
FIG. 5 is a front elevational cross sectional view similar to FIG. 4 after complete compression of the wave-shaped washer.

Referring to FIG. 5 and again to FIG. 4, a completed installation of fastener 10 is presented. Friction between wave-shaped washer 20 and heat shield 48 inhibits axial rotation of wave-shaped washer 20 after the position of FIG. 4 is reached. The frangible connectors 26 therefore fracture, and subsequent axial rotation of body 12 from the position shown in FIG. 4 brings lower surface 28 of flange 16 into direct contact with upper face 56 of each of the peaks 24. The fractured frangible connectors 26 deflect and flatten during this period. Continued rotation of body 12 until a predetermined installation torque value is achieved first compresses and/or crushes the deflected frangible connectors 26 and then acts to compress wave-shaped washer 20. Although some thickness of the frangible connectors 26 may remain, the clearance gap 40 is reduced substantially to a dimension approaching zero.

Compression of wave-shaped washer 20 collapses the peaks 24 and valleys 22, reducing the distance "D" to a thickness "E" which corresponds to a nominal thickness of wave-shaped washer 20. The material of wave-shaped washer 20 when compressed elastically seeks to return peaks 24 and valleys 22, therefore compressing wave-shaped washer 20 from distance "D" to thickness "E" creates a biasing force "F" acting upwardly as viewed in FIG. 5 and co-axial with longitudinal axis 18 against the threads 50 of weld-stud 42. The biasing force "F" is a function in part of the amount of deflection of the material of wave-shaped washer 20, and acts to resist rotation/release of fastener 10 from the installed position shown. In the installed position shown, the weld-stud 42 can extend outwardly with respect to body 12.

Figure 6:
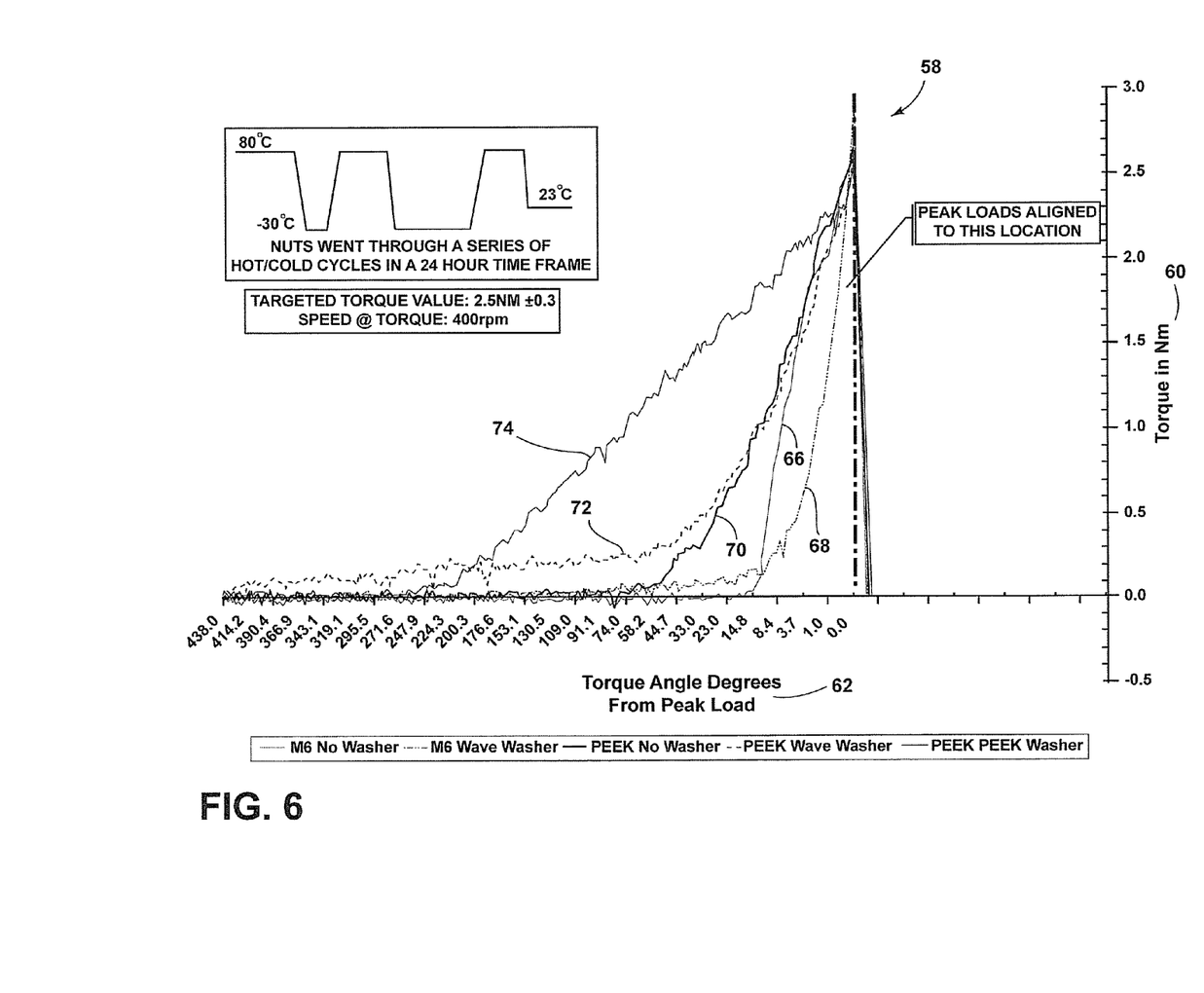
FIG. 6 is a graph of applied torque versus resulting torque angle comparing PEEK (polyetherether ketone) material fasteners against standard metal fasteners.

Referring to FIG. 6, a torque vs. torque angle degree graph 58 compares various nut/washer combinations of materials for an applied torque 60 and a resulting torque angle 62 in degrees. A combination of a standard M6 fastener with a washer of metal exhibited the second highest slope of change from an initiation of washer contact to maximum torque required for seating. A combination 68 of a standard M6 fastener of metal with a metal wave washer exhibited the highest slope of change from an initiation of washer contact to maximum torque required for seating. A PEEK material fastener 70 with no washer exhibited a similar slope of change from an initiation of washer contact to maximum torque required for seating compared to combinations 66, 68. A combination 72 of a metal fastener with a PEEK wave washer provided an improved slope of change from an initiation of washer contact to maximum torque required for seating, compared to combinations 66, 68 and 70. A combination 74 having a PEEK fastener with a PEEK wave washer provided the greatest distribution of torque angle per value of applied torque compared to the combinations 66, 68, 70, 72, indicating a PEEK fastener and PEEK wave washer similar to fastener 10 improves the distribution of torque over a wider range of torque angles, which reduces the friction load applied to the heat shield before the maximum desired seating torque is achieved.

Figure 7:
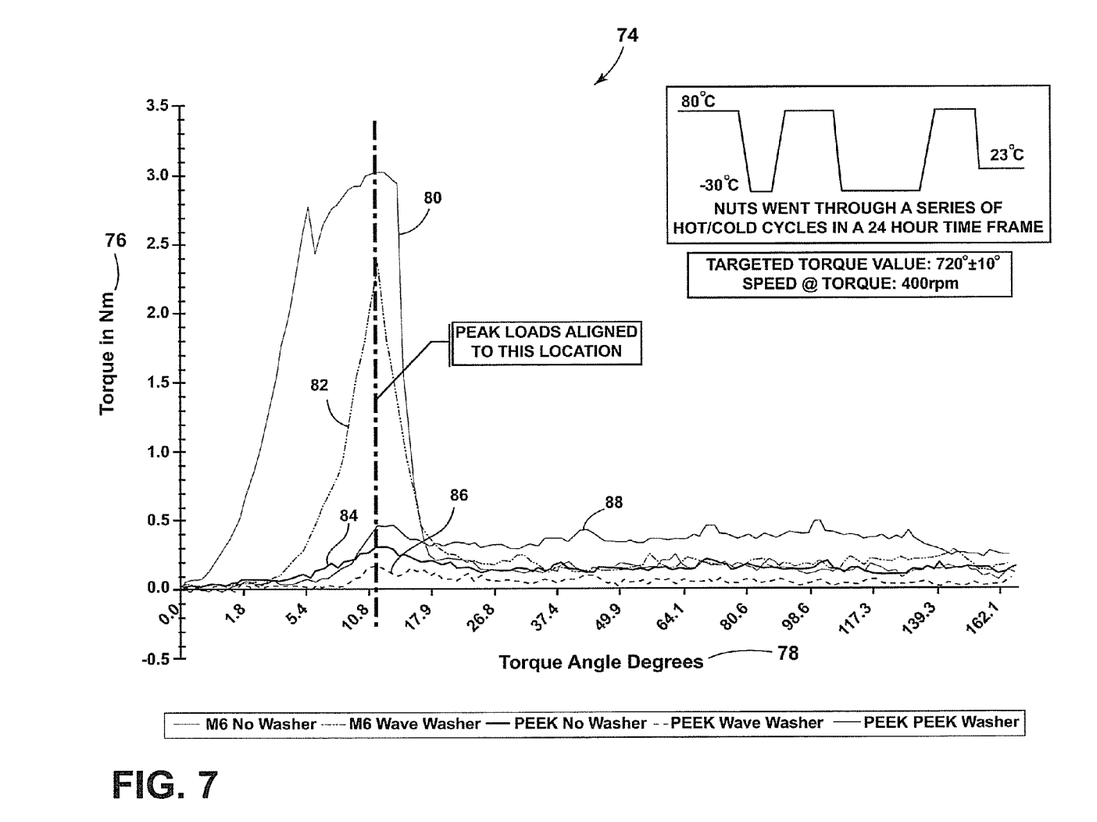
FIG. 7 is a graph of torque values required for fastener release compared to torque angle comparing PEEK material fasteners against standard metal fasteners.

Referring to FIG. 7, a torque vs. torque angle degree graph 74 compares various nut/washer combinations of materials for a torque 76 required to remove a fastener and a resulting torque angle 78 in degrees. A combination 80 of a standard M6 fastener with a washer of metal exhibited the most rapid drop-off slope from an initiation of fastener release to minimum torque during fastener removal. A combination 82 of a standard M6 fastener of metal with a metal wave washer exhibited a similar slope of change compared to combination 80. A PEEK material fastener 84 with no washer exhibited the second lowest initiation torque level to initiate fastener removal and substantially no difference from the onset of fastener release to full release compared to combinations 80, 82. A combination 86 of a metal fastener with a PEEK wave washer performed the most poorly, compared to combinations 66, 68 and 70. A combination 88 of a PEEK fastener with a PEEK wave washer similar to fastener 10 did not provide the high onset torque values of metal fasteners, which is anticipated, however combination 88 provided an initially higher initiation removal torque compared to combinations 84, 86, and also provided an improved distribution of torque angle per value of torque over the entire range of motion compared to any of the combinations 80, 82, 84, 86. This indicates a PEEK fastener and PEEK wave-shaped washer similar to fastener 10 can improve the resistance to fastener release over a wider range of torque angles, inhibiting release of fastener 10.

Figure 8:
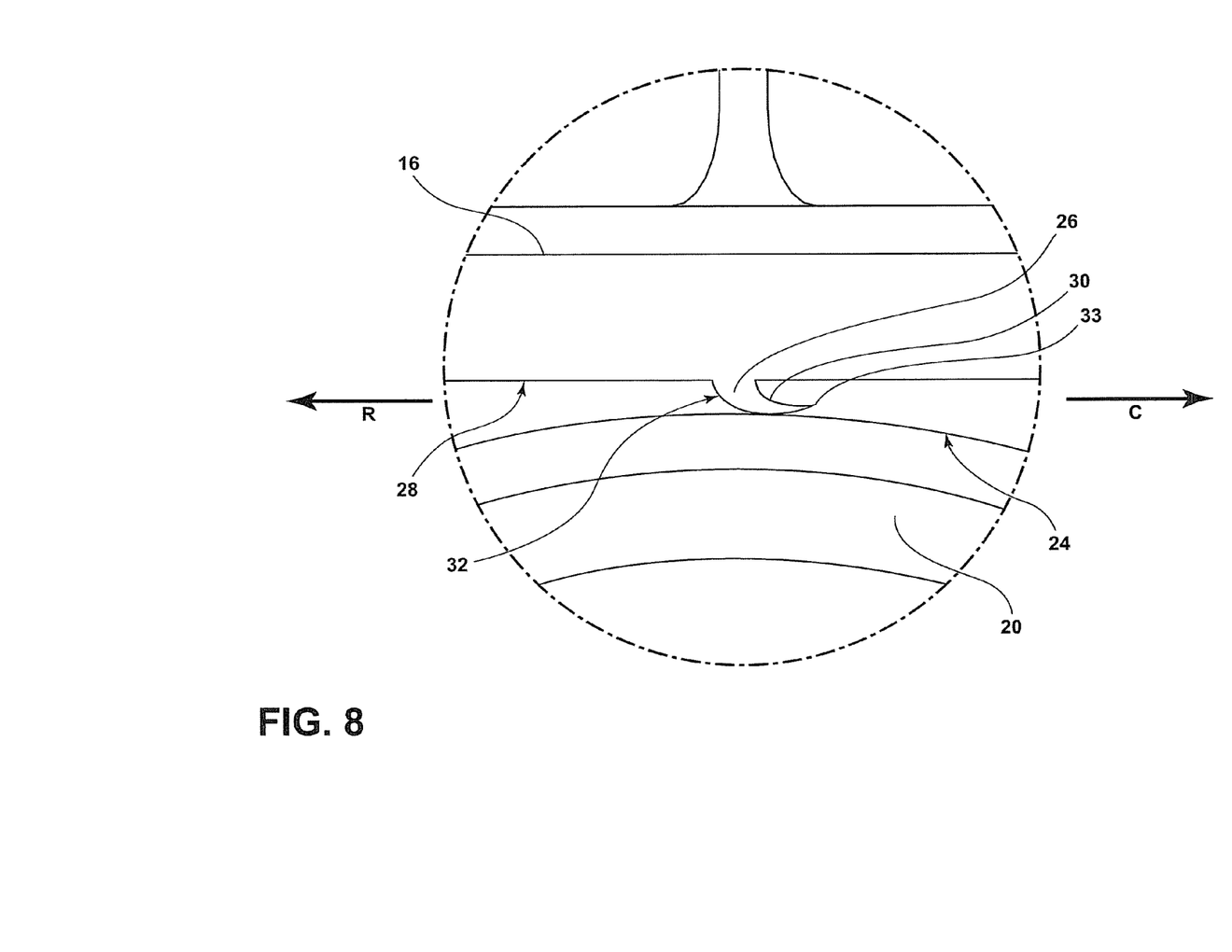
FIG. 8 is a front elevational view similar to area 2B of FIG. 1, further showing one of the frangible connectors after fracture and during compression of the wave-shaped washer.

Referring to FIG. 8 and again to FIGS. 2A and 2B, an orientation of an exemplary one of the frangible connectors 26 is shown after fracture at connecting tip 33 and as second side 32 slides with respect to upper face 56 of peak 24. Because of their minimal thickness Tmin and due to sliding motion along second side 32, the fractured end of connecting tips 33 are not intended to bite into the material of upper face 56 of the peaks 24. In lieu of acting as bite members after fracture, frangible connectors 26 are substantially compressed by application of full installation torque to body 12, and therefore do not provide substantial resistance to release of body 12. Thickness Tmin is therefore selected to provide a minimum retention capability to retain wave-shaped washer 20 in contact with flange 16 until use/installation of fastener 10.

Figure 9A:
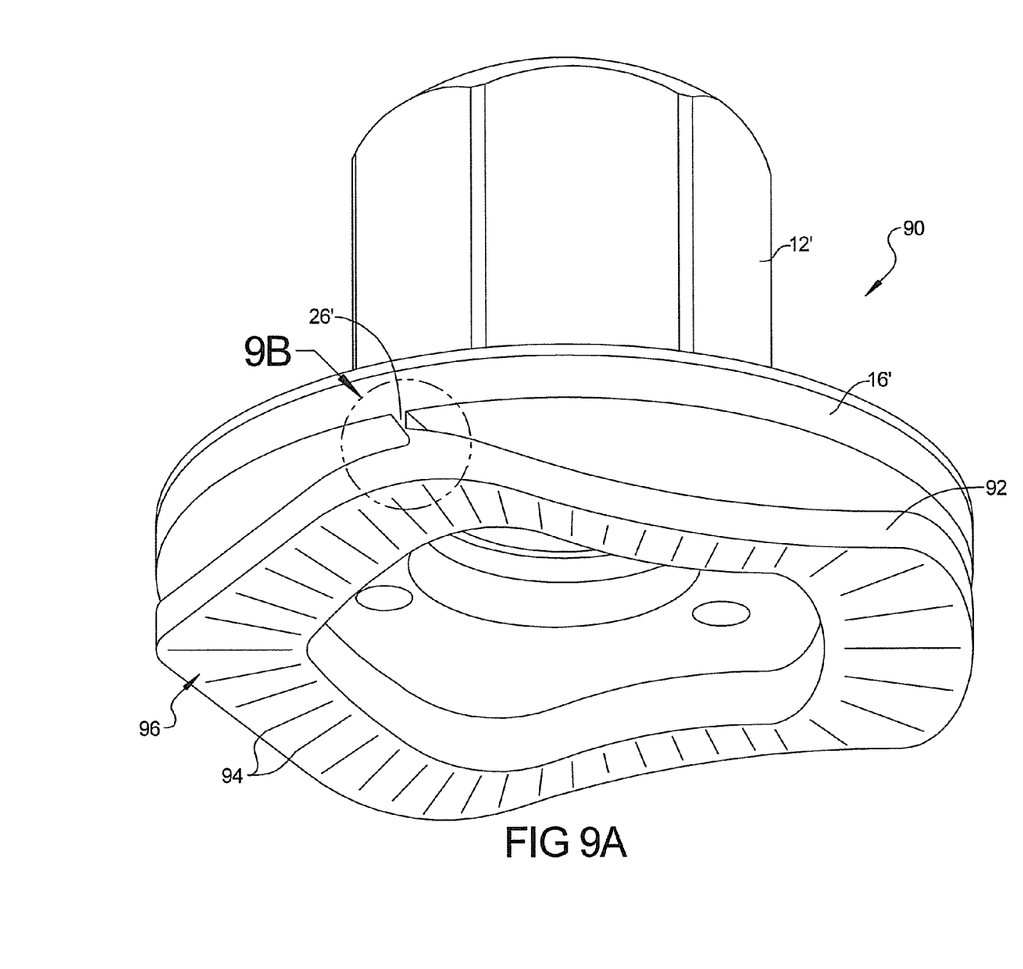
FIG. 9A is a front lower perspective view of another aspect having serrations on a lower surface of the wave-shaped washer.
Figure 9B:
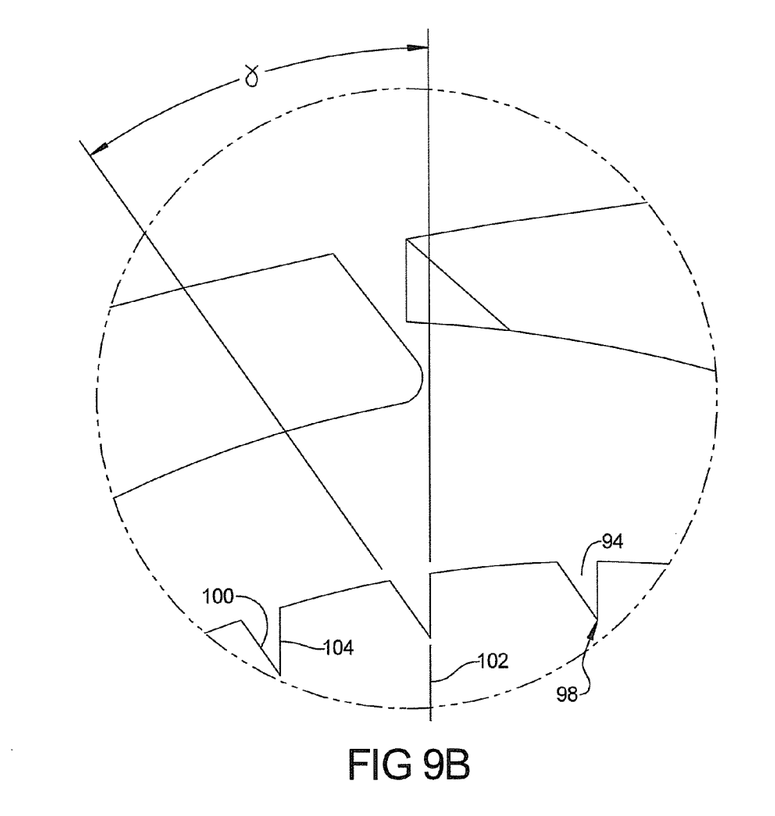
FIG. 9B is a front lower perspective view of area 9B of FIG. 9A.

Referring to FIGS. 9A and 9B, according to further aspects, a high heat fastener 90 includes a similar polygonal shaped body 12' with a similar integrally connected flange 16' and similar frangible connectors 26'. The high heat fastener 90 is integrally connected to body 12 includes a wave-shaped washer 92 modified from wave-shaped washer 20 to further include a plurality of serrations 94 extending away from an outward facing surface 96. The serrations 94 are similar in geometry to frangible connectors 26. Each of the serrations 94 includes a free end 98 defining a sharp corner due to a triangular shape of the serrations 94. A first side 100 of each of the serrations 94 is oriented substantially co-axial with respect to an axis 102 oriented substantially transverse to a plane defined by the junction of the first side 100 of each serration 94 with outward facing surface 96. A second side 104 of each of the serrations 94 is oriented at an acute angle γ (gamma) with respect to axis 102. The serrations are angularly oriented to limit resistance during installation of wave-shaped washer 92 in a clockwise installation rotational direction of high heat fastener 90, but resist release in an opposite or a counter clockwise release direction.

According to several embodiments, a material for fastener 10 can be PEEK (polyetherether ketone), which provides elevated operating temperatures in a range necessary for application with a heat shield, such as a heat shield positioned proximate to an automobile vehicle catalytic converter. Other polymeric materials can also be used that are suitable for high temperature or high heat resistant applications, e.g., having a glass temperature equal to or greater than 140° C.

A fastener of the present disclosure provides several advantages. The fastener 10 provides a high heat resistant plastic material that is corrosion resistant. In addition, the fastener 10 integrally includes a wave-shaped washer that by its shape induces a biasing force when collapsed during installation, thereby increasing a resistance against fastener release due to temperature change and/or vibration. The fastener wave-shaped washer 20 partially deflects to absorb the installation torque which creates a biasing force acting to resist loosening of the fastener, and includes triangular shaped frangible connectors that fracture or break at a narrow thickness connecting end and are angularly oriented permitting the body to rotate freely with respect to the wave-shaped washer during installation to mitigate against the wave-shaped washer rotating against the heat shield.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A polymeric fastener, comprising:
a body adapted to receive a tool induced rotational torque and the body having a body longitudinal axis of rotation;
a flange integrally connected to the body and defining a downwardly facing surface extending substantially perpendicular to the body longitudinal axis;
a wave-shaped washer integrally connected to the flange, the wave-shaped washer having multiple valleys interposed between multiple oppositely directed peaks and defining an upwardly facing surface extending substantially perpendicular to the body longitudinal axis and opposing the downwardly facing surface of the flange; and
multiple frangible connectors integrally connecting the flange to the wave-shaped washer, each frangible connector integrally connected at a first end to the flange along the downwardly facing surface of the flange, and integrally connected at an opposite connecting end of the frangible connector to the wave-shaped washer along the upwardly facing surface and at an individual one of the peaks;
wherein the frangible connector has a minimal thickness at and extending along one of the upwardly facing surface of the washer and the downwardly facing surface of the flange, and wherein the multiple frangible connectors are positioned in a space between the downwardly facing surface of the flange and the opposing upwardly facing surface of the wave-shaped washer, and wherein the frangible connectors are bent, flattened, or both, between the downwardly facing surface of the flange and the upwardly facing surface of the wave-shaped washer when rotation of the wave-shaped washer is frictionally inhibited while the body is axially rotated in an insertion direction "R".

2. The polymeric fastener of claim 1, wherein each of the frangible connectors has a triangular shape including a first side oriented substantially perpendicular to the downwardly facing surface of the flange.

3. The polymeric fastener of claim 1, wherein each of the frangible connectors has a side facing an insertion direction of rotation "R" that is oriented at an obtuse angle with respect to the downwardly facing surface of the flange.

4. The polymeric fastener of claim 1, further including multiple serrations each extending away from a downwardly facing surface of the wave-shaped washer.

5. The polymeric fastener of claim 4, wherein each of the serrations has a triangular shape including a free end defining a sharp corner.

6. The polymeric fastener of claim 4, wherein each of the serrations includes:
a first side oriented substantially co-axial with respect to an axis oriented substantially transverse to a plane defined by the junction of the first side of each serration with the downwardly facing surface of the wave-shaped washer; and
a second side oriented at an acute angle with respect to the axis.

7. The polymeric fastener of claim 1:
wherein each of the frangible connectors has a triangular shape including a first side and a second side angularly oriented with respect to the first side; and
wherein the second side is positioned in an orientation facing the wave-shaped washer, allowing the body to freely axially rotate with respect to the wave-shaped washer after fracture of the frangible connectors the second side providing for sliding contact between the second side and the peaks.

8. The polymeric fastener of claim 1, wherein each of the frangible connectors has a triangular shape including a first side and a second side angularly oriented with respect to the first side, the first side and the second side joining at the opposite connecting end defining a fracture line extending radially outward with respect to the body longitudinal axis.

9. The polymeric fastener of claim 1, wherein each of the frangible connectors has a triangular shape with the opposite connecting end being narrower than the first end, thereby inducing fracture of the frangible connector to occur at the opposite connecting end upon application of the torque when rotation of the wave-shaped washer is frictionally inhibited and the body is axially rotated.

10. The polymeric fastener of claim 1, wherein a shear force acting in a direction perpendicular to the body longitudinal axis acts against the frangible connectors when the body is axially rotated with respect to the wave-shaped washer, thereby acting to break the frangible connectors at the opposite connecting end.

11. The polymeric fastener of claim 1, wherein the body is made from a high temperature resistant material having a glass temperature equal to or greater than 140° C.

12. The polymeric fastener of claim 1, wherein the high temperature resistant material is PEEK (polyetherether ketone).

13. A polymeric fastener, comprising:
a body having multiple sides adapted to be engaged by a tool for applying torque to axially rotate the body with respect to a body longitudinal axis;
a flange integrally connected to the body and extending perpendicular to the body longitudinal axis and defining a downwardly facing surface extending substantially perpendicular to the body longitudinal axis;
a wave-shaped washer integrally connected to the flange, the wave-shaped washer having multiple valleys interposed between multiple oppositely directed peaks and defining an upwardly facing surface extending substantially perpendicular to the body longitudinal axis and opposing the downwardly facing surface of the flange; and
multiple triangular shaped frangible connectors integrally joining the flange to the wave-shaped washer, each frangible connector integrally connected at a first end to the flange, and oppositely integrally connected at a connecting tip to an individual one of the peaks, the connecting tip having a reduced thickness compared to the first end to induce fracture of each frangible connector at the connecting tip extending along the upwardly facing surface of the wave-shaped washer;
wherein the multiple frangible connectors are positioned in a space between the downwardly facing surface of the flange and the opposing upwardly facing surface of the wave-shaped washer, and wherein the frangible connectors are bent, flattened, or both, between the downwardly facing surface of the flange and the upwardly facing surface of the wave-shaped washer when rotation of the wave-shaped washer is frictionally inhibited while the body is axially rotated in an insertion direction "R".

14. The polymeric fastener of claim 13, wherein the triangular shape frangible connectors each include a first side oriented substantially perpendicular to the downwardly facing surface of the flange.

15. The polymeric fastener of claim 13, wherein each of the frangible connectors has a side facing an insertion direction of rotation "R" that is oriented at an obtuse angle with respect to the downwardly facing surface of the flange.

16. The polymeric fastener of claim 13, wherein each of the frangible connectors includes a first side and a second side angularly oriented with respect to the first side, the first side and the second side joining at the connecting tip defining a fracture line extending radially outward and transverse with respect to the body longitudinal axis.

17. The polymeric fastener of claim 13, wherein each of the frangible connectors includes a maximum thickness where joined to the flange.

18. The polymeric fastener of claim 13, wherein the triangular shape frangible connectors each include a first side angularly oriented and defining an acute angle with respect to the downwardly facing surface of the flange and a second side defining an obtuse angle with respect to the downwardly facing surface of the flange.

19. A polymeric fastener, comprising:
a body having multiple sides adapted to be engaged by a tool for applying torque to axially rotate the body with respect to a body longitudinal axis;
a flange integrally connected to the body and extending perpendicular to the body longitudinal axis and defining a downwardly facing surface extending substantially perpendicular to the body longitudinal axis;
a wave-shaped washer integrally connected to the flange, the wave-shaped washer having multiple valleys interposed between multiple oppositely directed peaks and defining an upwardly facing surface extending substantially perpendicular to the body longitudinal axis and opposing the downwardly facing surface of the flange; and
multiple triangular shaped frangible connectors integrally joining the flange to the wave-shaped washer, each frangible connector integrally connected along the downwardly facing surface of the flange at a first end having a maximum thickness to the flange, and oppositely integrally connected along the upwardly facing surface at a connecting tip having a minimum thickness to an individual one of the peaks, the connecting tip minimum thickness defining a fracture line extending along the upwardly facing surface and substantially perpendicular to the body longitudinal axis acting to induce fracture of each frangible connector at the connecting tip along the upwardly facing surface during axial rotation of the body with respect to the wave-shaped washer;
wherein the multiple frangible connectors are positioned in a space between the downwardly facing surface of the flange and the opposing upwardly facing surface of the wave-shaped washer, and wherein the frangible connectors are bent, flattened, or both, between the downwardly facing surface of the flange and the upwardly facing surface of the wave-shaped washer when rotation of the wave-shaped washer is frictionally inhibited while the body is axially rotated in an insertion direction "R".

20. The polymeric fastener of claim 19, wherein the body, the flange, the wave-shaped washer, and the frangible connectors are initially integrally connected and are homogeneous in that a same material and material properties exist throughout the fastener.

21. The polymeric fastener of claim 20, wherein the material is a PEEK plastic.

22. The polymeric fastener of claim 19, wherein the connecting tips extend for an entire width of the frangible connectors connecting each frangible connector to one of the peaks of the wave-shaped washer.

23. The polymeric fastener of claim 19, wherein the peaks together define a closest point of approach of the wave-shaped washer with respect to the flange in a manufactured condition of the fastener.

* * * * *

UNITED STATES PATENT AND TRADEMARK OFFICE
CERTIFICATE OF CORRECTION

| | | |
|---|---|---|
| PATENT NO. | : 8,974,164 B2 | Page 1 of 1 |
| APPLICATION NO. | : 13/533528 | |
| DATED | : March 10, 2015 | |
| INVENTOR(S) | : Steven M. Benedetti et al. | |

It is certified that error appears in the above-identified patent and that said Letters Patent is hereby corrected as shown below:

Claims

Column 9,

Line 47 (Claim 14), delete "first".

Signed and Sealed this
Twenty-seventh Day of October, 2015

Michelle K. Lee
*Director of the United States Patent and Trademark Office*